US011952667B2

(12) United States Patent
Curchod et al.

(10) Patent No.: US 11,952,667 B2
(45) Date of Patent: Apr. 9, 2024

(54) METHOD FOR DEPOSITING A DECORATIVE AND/OR FUNCTIONAL METAL LAYER ON A SURFACE OF AN ARTICLE MADE OF AN ELECTRICALLY NON-CONDUCTIVE CERAMIC MATERIAL

(71) Applicant: The Swatch Group Research and Development Ltd, Marin (CH)

(72) Inventors: Loïc Curchod, Lausanne (CH); Pierry Vuille, Les Emibois (CH)

(73) Assignee: The Swatch Group Research and Development Ltd, Marin (CH)

( * ) Notice: Subject to any disclaimer, the term of this patent is extended or adjusted under 35 U.S.C. 154(b) by 83 days.

(21) Appl. No.: 17/476,909

(22) Filed: Sep. 16, 2021

(65) Prior Publication Data
US 2022/0155729 A1 May 19, 2022

(30) Foreign Application Priority Data

Nov. 19, 2020 (EP) .................................... 20208605

(51) Int. Cl.
| | |
|---|---|
| C23C 8/02 | (2006.01) |
| A44C 27/00 | (2006.01) |
| C04B 41/00 | (2006.01) |
| C04B 41/50 | (2006.01) |
| C04B 41/51 | (2006.01) |
| C25D 5/54 | (2006.01) |
| C25D 7/00 | (2006.01) |
| G04B 17/06 | (2006.01) |
| G04B 19/12 | (2006.01) |
| G04B 37/22 | (2006.01) |

(52) U.S. Cl.
CPC .............. *C23C 8/02* (2013.01); *A44C 27/006* (2013.01); *C04B 41/0054* (2013.01); *C04B 41/009* (2013.01); *C04B 41/5001* (2013.01); *C04B 41/5111* (2013.01); *C25D 5/54* (2013.01); *C25D 7/005* (2013.01); *G04B 17/063* (2013.01); *G04B 19/12* (2013.01); *G04B 37/226* (2013.01)

(58) Field of Classification Search
CPC . A44C 27/006; C04B 41/0054; C04B 41/009; C04B 41/5001; C04B 41/5111; C25D 5/54; C25D 7/005; G04B 37/226; C23C 8/02; C23C 8/20; C23C 8/24
USPC .......................................................... 427/299
See application file for complete search history.

(56) References Cited

U.S. PATENT DOCUMENTS

| | | | | |
|---|---|---|---|---|
| 3,958,070 A | * | 5/1976 | Schintlmeister | ........ C23C 16/38 |
| | | | | 428/209 |
| 2003/0008168 A1 | * | 1/2003 | Shibuya | ................ C23C 14/165 |
| | | | | 204/192.15 |
| 2005/0136284 A1 | * | 6/2005 | Grippo | ............... G04B 45/0076 |
| | | | | 428/688 |
| 2007/0228007 A1 | * | 10/2007 | Besson | ................. C04B 41/009 |
| | | | | 216/65 |
| 2010/0047618 A1 | * | 2/2010 | Rostagno | .............. B32B 15/018 |
| | | | | 164/75 |
| 2011/0259753 A1 | | 10/2011 | Grossenbacher et al. | |
| 2014/0112112 A1 | | 4/2014 | Plankert et al. | |
| 2018/0057923 A1 | * | 3/2018 | Faure | ........................ C23C 8/80 |
| 2019/0189394 A1 | * | 6/2019 | Miko | ................ H01J 37/32678 |
| 2020/0264566 A1 | * | 8/2020 | Curchod | ................. C23C 14/14 |

FOREIGN PATENT DOCUMENTS

| | | |
|---|---|---|
| CN | 103771907 A | 5/2014 |
| CN | 104096939 A | 10/2014 |
| CN | 105081502 A | 11/2015 |
| CN | 107778007 A | 3/2018 |
| CN | 109641804 A | 4/2019 |
| EP | 2 380 864 A1 | 10/2011 |
| EP | 2 725 000 A1 | 4/2014 |
| EP | 3 181 006 A1 | 6/2017 |
| EP | 3 287 857 A1 | 2/2018 |
| EP | 3 591 099 A1 | 1/2020 |
| JP | 2003-253473 A | 9/2003 |
| JP | 2003-277979 A | 10/2003 |
| JP | 2003277979 | * 10/2003 |
| JP | 2004-84036 A | 3/2004 |
| JP | 2011-230506 A | 11/2011 |

OTHER PUBLICATIONS

European Search Report dated May 12, 2021 in European Application 20208605.4, filed on Nov. 19, 2020 (with English Translation of Categories of cited documents), 3 pages.
Notice of the Reason for Refusal dated Sep. 27, 2022 in Japanese Patent Application No. 2021-158791 (with English language translation), 8 pages.
Combined Chinese Office Action and Search Report dated Sep. 10, 2022 in Patent Application No. 202111312967.X (with English language translation and English translation of Category of Cited Documents), 19 pages.

* cited by examiner

*Primary Examiner* — Brian K Talbot

(74) *Attorney, Agent, or Firm* — Oblon, McClelland, Maier & Neustadt, L.L.P.

(57) ABSTRACT

A method for depositing a decorative and/or functional layer on at least a portion of a surface of a finished or semi-finished article made of a non-conductive ceramic material, this deposition method includes the following operations: subjecting the at least a portion of the surface of the article to a carburising or nitriding treatment during which carbon, respectively nitrogen atoms, diffuse in the at least a portion of the surface of the article, then depositing, by galvanic growth of a metallic material, the decorative and/or functional layer on at least a portion of the surface of the article which has undergone the carburising or nitriding treatment.

30 Claims, No Drawings

METHOD FOR DEPOSITING A DECORATIVE AND/OR FUNCTIONAL METAL LAYER ON A SURFACE OF AN ARTICLE MADE OF AN ELECTRICALLY NON-CONDUCTIVE CERAMIC MATERIAL

CROSS-REFERENCE TO RELATED APPLICATION

This application claims priority to European Patent Application No. 20208605.4 filed on Nov. 19, 2020, the entire disclosure of which is hereby incorporated herein by reference.

TECHNICAL FIELD OF THE INVENTION

The present invention relates to a method for depositing by galvanic growth a decorative and/or functional metal layer on at least a portion of the surface of a finished or semi-finished article made of an initially electrically non-conductive ceramic material.

TECHNOLOGICAL BACKGROUND OF THE INVENTION

A technique currently used at the present time for depositing by galvanic growth a decorative and/or functional layer on a finished or semi-finished article made of an electrically non-conductive material such as ceramic consists in depositing firstly at least on a portion of the surface of this article an adhesion layer followed by a seed layer both electrically conductive. The adhesion layer, typically produced by Physical Vapour Deposition—a technique also known as PVD—can for example be produced from chromium. After depositing the adhesion layer, a seed layer is deposited. This seed layer, deposited using the same technique as the adhesion layer or a similar technique, is preferably produced using the same material, for example gold, as that which will be used to grow the decorative or functional layer. After deposition of the seed layer, advantage is taken of the good electrical conductivity of the chromium and gold layers to grow by galvanic growth in a thick layer the decorative or functional layer on the surface of the article.

A method of the type briefly described above is used, for example, for the production of wristwatch bezels made of zirconia $ZrO_2$ on which inserts made of gold or of another precious metal alloy are structured. To this end, recesses of the desired shape are previously machined on the bezel. PVD depositions of thin layers of chromium (adhesion layer) and gold (seed layer) are then carried out over the entire surface of the bezel, including in the recesses, then a thick layer of the desired material is grown by electroplating, typically a gold-based alloy, on the seed layer. Finally, the surface of the bezel is reworked and mechanically polished in order to remove the excess precious metal and leave it only in the recesses.

The above technique advantageously allows to deposit functional or decorative layers on finished or semi-finished articles made of electrically non-conductive materials such as ceramics. However, this technique is not without any problem; indeed, it happens to be confronted with delamination problems both of the chromium layer on the zirconia and of the gold layer on the chromium layer, which leads to having to discard the articles affected by this type of problem. Likewise, physical vapour deposition, which is a fairly directional deposition technique, does not always allow to guarantee that the thin layers will perfectly match the contour of structures of small dimensions such as recesses machined in a bezel of a wristwatch. Finally, as it is necessary, in the case described here, to deposit two primer materials of different natures (for example chromium for the adhesion layer and gold for the seed layer), it is necessary to have available equipment with at least 2 cathodes for the 2 different materials. However, such equipment is expensive. In the event that such an installation is not available, it is always possible to deposit the first adhesion layer, then to break the vacuum in order to be able to replace the chromium target with a gold target before performing the second deposition. Such an operation is however long and therefore costly and its success is not guaranteed despite the precautions taken, so that if the first deposition is polluted and/or contaminated when the article is contacted again with air during the target change, this can lead to delamination problems of the second thin layer on the first thin layer.

In an attempt to solve these problems, it has already been proposed to subject at least a portion of the surface of a finished or semi-finished ceramic article to a reduction reaction in order to significantly deplete it in oxygen to a predetermined depth and to make it electrically conductive. The reduction reaction is carried out, for example, by means of a plasma formed by ionisation of a mixture of hydrogen and a neutral gas. Depending on the duration of the plasma treatment, the significantly reduced ceramic surface layer extends from the surface of the article to a depth comprised between 20 nm and 10 µm. This reduction step therefore allows to create, from the surface of the article towards the centre thereof, a surface layer which has an oxygen sub-stoichiometry of the ceramic.

The oxygen depletion of the surface layer makes it electrically conductive. Consequently, after this reduction step, a layer of metallic material can be electroplated on the portions of the surface of the ceramic article made electrically conductive to form decorative and/or functional patterns.

The method briefly described above allows to deposit on at least a portion of the surface of an article made of an initially electrically non-conductive material decorative and/or functional metal layers while avoiding physical vapour deposition of usual adhesion and seed layers. This avoids the recurring risks of delamination of the layers deposited by PVD techniques. Nevertheless, it has been realised that to make the ceramic article sufficiently electrically conductive to allow the deposition of decorative and/or functional metallic layers of quality, it is necessary to reduce the ceramic very considerably, which does not go without laying down problems. Indeed, in many fields such as watchmaking and jewellery, zirconia stabilised in tetragonal phase $t-ZrO_2$ at room temperature is used by adding 3 mol % of yttrium oxide or yttria $Y_2O_3$, in particular for its high tenacity. However, a strong reduction of the tetragonal zirconia causes a transition from the tetragonal phase to a cubic or monoclinic phase which is significantly less tenacious. In addition, the oxygen atoms present in the ceramic being very mobile, a partial reduction of the ceramic takes place in a large portion of the volume of the ceramic article, sometimes up to its centre, and not only in its surface layers, which considerably weakens the article.

SUMMARY OF THE INVENTION

The purpose of the present invention is to overcome the above-mentioned problems as well as others still by proposing a method for depositing by galvanic growth a decorative and/or functional layer on at least a portion of a surface of an article made of an initially non-electrically conductive material which allows in particular to dispense with the deposition of added layers on the surface of the article and which does not weaken this article.

To this end, the present invention relates to a method for depositing a decorative and/or functional layer on at least a portion of a surface of a finished or semi-finished article made of an electrically non-conductive ceramic material, this deposition method comprising the following operations:

subjecting the at least a portion of the surface of the article to a carburising or nitriding treatment during which carbon, respectively nitrogen atoms, diffuse in the at least a portion of the surface of the article, then depositing, by galvanic growth of a metallic material, the decorative and/or functional layer on at least the portion of the surface of the article which has undergone the carburising or nitriding treatment.

According to a particular embodiment of the invention, the article is made of zirconia $ZrO_2$.

According to another particular embodiment of the invention, the zirconia is stabilised in its tetragonal phase $t-ZrO_2$.

According to yet another particular embodiment of the invention, the zirconia is stabilised in its tetragonal phase at room temperature by adding 3 mol % of yttrium oxide $Y_2O_3$ to the composition of the zirconia.

According to yet another particular embodiment of the invention, at least the portion of the surface of the finished or semi-finished article is subjected to a prior reduction treatment during which an oxygen depletion takes place from the surface of the finished or semi-finished article towards the centre thereof.

According to yet another particular embodiment of the invention, the method of surface treatment of the article is carried out in a plasma reactor or in a hot filament reactor.

According to yet another particular embodiment of the invention, when the article is subjected to a plasma carburising treatment, said article is introduced into a reactor wherein a plasma obtained from the ionisation of a mixture of hydrogen, neutral gas and traces of carbon is generated in order to create a reactive atmosphere made up of hydrogen atoms and carbon atoms.

According to yet another particular embodiment of the invention, the traces of carbon used to form the plasma are obtained from a hydrocarbon or a mixture of such hydrocarbons.

According to yet another particular embodiment of the invention, the hydrocarbon(s) are selected from the group formed of ethane, methane and acetylene.

According to yet another particular embodiment of the invention, when the article is subjected to a plasma nitriding treatment, said article is introduced into a reactor wherein a plasma obtained from the ionisation of a mixture of hydrogen, neutral gas and traces of nitrogen is generated in order to create a reactive atmosphere made up of hydrogen atoms and nitrogen atoms.

According to yet another particular embodiment of the invention, the traces of nitrogen used to form the plasma are obtained from nitrogen gas $N_2$ or ammonia $NH_3$.

According to yet another particular embodiment of the invention, the neutral gas is argon.

According to yet another particular embodiment of the invention, the article is maintained in the reactive atmosphere created by the plasma for a duration comprised between 15 and 240 minutes and preferably equal to 150 minutes.

According to yet another particular embodiment of the invention, the average temperature of the article during the plasma treatment varies between 500° C. and 1300° C.

According to yet another particular embodiment of the invention, the diffusion of carbon or nitrogen atoms creates crystallites of zirconium carbide ZrC, respectively of zirconium nitride ZrN, to a depth of 1 micrometre from the surface of the article.

According to yet another particular embodiment of the invention, the surface electrical resistance of the article after carburising or nitriding treatment is less than 10 Ω/□.

According to yet another particular embodiment of the invention, the metallic material for the galvanic growth is selected from the group formed of gold, silver, copper, platinum, indium, palladium, rhodium, white and yellow bronzes, nickel and alloys of these metals.

Thanks to these features, the present invention provides a method allowing to deposit by electroplating a decorative and/or functional metallic layer on an article made of an initially electrically non-conductive ceramic material. The advantage of this method lies in particular in the fact that it involves intrinsic phenomena of transformation of the material allowing to dispense with the conventional operations of depositing adhesion and seed layers and therefore to overcome the problems of delamination inherent in these layer deposition techniques. In addition, the carburising or nitriding treatment is naturally applied at the same rate to the entire surface of the article exposed to the atmosphere of the reactor and is thus more compliant and homogeneous than the physical vapour deposition of the adhesion and seed layers of the prior art which are directive. By teaching to subject an article made of an electrically non-conductive ceramic material such as zirconia to a nitriding or carburising treatment, the present invention allows to create on the surface of the article thus treated a surface layer having an electrical conductivity greater than that obtained by subjecting such an article only to a partial reduction treatment. Indeed, the diffusion of carbon or nitrogen atoms in the surface layer of the article at the places left vacant by the oxygen atoms creates crystallites of zirconium carbide ZrC, respectively of zirconium nitride ZrN, much more conductive than the simple reduced zirconia $ZrO_{2-x}$. Thus, even if the carburising or nitriding operations necessarily imply a partial reduction of the zirconia in its entire volume, the intensity of this reduction and therefore the relative risk of embrittlement can be kept at a relatively low level compared to that of the pure reduction treatment of the prior art, while giving the surface layer of the article excellent electrical conductivity. The invention therefore provides a method that is both more effective for making the surface of the article electrically conductive, and less unfavourable with regard to the mechanical strength of this article.

DETAILED DESCRIPTION OF AN EMBODIMENT OF THE INVENTION

The present invention proceeds from the general inventive idea which consists in subjecting an electrically non-conductive ceramic article having previously undergone a carburising or nitriding treatment to a deposition, by galvanic growth, of a metal layer with decorative and/or functional function. The present invention thus advantageously takes advantage of the fact that the carburising or nitriding treatment of the ceramic part makes it electrically conductive on the surface in order to be able to deposit a metal layer by electroplating. Thanks to the invention, it is thus possible in particular to avoid the techniques of physical vapour deposition of the adhesion and seed layers of the prior art and the problems which frequently accompany these techniques, namely the risks of delamination and poor abrasion resistance of the deposited layers. It should also be noted that a carburising or nitriding treatment allows to make a part made of a ceramic material which is initially electrically non-conductive a better conductor of electricity than a simple reduction treatment. In addition, a carburising or nitriding treatment weakens the ceramic part less than the pure reduction treatment necessary to obtain an equivalent electrical conductivity. Finally, the techniques used for the carburising or nitriding treatments, namely plasma or hot filament(s), are of the diffusive and non-directive type like PVD. Consequently, it is easier to treat, for example, recesses or through holes with this non-directional technique than with a directional technique such as PVD.

By way of illustrative and non-limiting example, use is made of a starting object formed by a zirconia article having a tetragonal crystallographic configuration (zirconium oxide t-$ZrO_2$) which is produced according to the usual techniques for manufacturing ceramic articles, for example by injection and sintering.

This article can be a finished product having the final shape and surface condition wherein it will be used, for example a part of generally parallelepipedal shape having already undergone a polishing and intended to constitute an external element of a timepiece, for example a bracelet link.

Of course, the article can also be a semi-finished product on which subsequent machining operations will be carried out in order to adapt this article to its end use.

It will be noted that the zirconia from which the article is made is preferably stabilised in its tetragonal phase at room temperature by adding 3 mol % of yttrium or yttria $Y_2O_3$.

The article is then subjected to a plasma carburising treatment. For this purpose, the article is introduced into a reactor wherein an at least partial vacuum is created by means of a pumping system, before generating a plasma obtained from the ionisation of a mixture of hydrogen, neutral gas and traces of carbon. This plasma is obtained for example using a direct current electric discharge. Of course, other means such as radio frequency (RF) waves or microwaves can be considered to generate the plasma.

Depending on the method used to obtain the plasma, the use of argon as neutral gas is advantageous. The use of neon is also possible.

The traces of carbon used to form the plasma can be obtained from hydrocarbons such as methane, acetylene, ethane or a mixture thereof. However, care will be taken to ensure that during the method, the relative concentrations of the various constituents of the plasma are such that there is no formation of carbon depositions on the surface of the article.

The article is maintained in the reactive atmosphere created by the plasma for a duration comprised between 15 and 240 minutes and preferably equal to 150 minutes. By adjusting the parameters for implementing the method (power delivered to the plasma, duration of the treatment, composition of the gas mixture, flow rates, etc.), the average temperature of the article is established between 600° C. and 1300° C. Auxiliary heating means can also be used for this purpose.

Under the action of the reactive atmosphere and temperature, the zirconia article is partially reduced and carbon atoms diffuse from its surface to its centre, forming a surface layer of zirconium carbide ZrC crystallites.

After plasma carburisation, the article has the metallic lustre and non-zero electrical conductivity characteristic of zirconium carbide, while retaining high surface hardness and high toughness that allow it to withstand wear under normal conditions of use.

One of the essential attractions of the plasma carburising method briefly described above lies in the fact that the zirconia article is transformed over a relatively small thickness, of the order of 10 to 1'000 nm, the zirconia (zirconium oxide) in the outer region being transformed into zirconium carbide having metallic properties. Preferably, the plasma carburisation method is adjusted so that the surface layer of zirconium carbide extends from the surface of the article to a depth comprised between 20 and 200 nm.

It is therefore a superficial modification of the structure of zirconia into a new crystallographic structure corresponding to that of zirconium carbide, which has little effect on the mechanical properties of the article. In addition, it is not a case of an added coating liable to be torn off or become detached from the surface of the article, in particular when the latter is subjected to high wear conditions.

The transition region which extends from the surface layer of zirconium carbide to the centre of the article comprises sub-stoichiometric zirconium carbide of the $ZrC_{1-y}$ type, the carbon content of which gradually decreases while moving closer to the centre of the article. In other words, the sub-stoichiometry of zirconium carbide increases closer to the centre of the article, while gradually, from a certain depth, an increasing amount of oxygen appears in the form of zirconium oxycarbide $ZrO_{2-x}C_{1-y}$.

The centre of the article is then reached, which consists of partially reduced zirconia of the $ZrO_{2-x}$ type and tetragonal phase zirconia t-$ZrO_2$.

According to another embodiment of the invention, the finished or semi-finished article of tetragonal zirconia is subjected to a plasma nitriding treatment. To this end, the article is introduced into a reactor wherein an at least partial vacuum is created by means of a pumping system, before generating a plasma obtained from the ionisation of a mixture of hydrogen, neutral gas and traces of nitrogen. This plasma is obtained for example using a direct current electric discharge. Of course, other means such as radio frequency (RF) waves or microwaves can be considered to generate the plasma.

Depending on the method used to obtain the plasma, the use of a neutral gas such as argon is advantageous. The use of neon is also possible. As for the traces of nitrogen used to form the plasma, they can be obtained from nitrogen gas $N_2$ or ammonia $NH_3$.

The article is maintained in the reactive atmosphere created by the plasma for a duration comprised between 15 and 240 minutes and preferably equal to 150 minutes, by adjusting the parameters for implementing the method (power delivered to the plasma, duration of the treatment, composition of the gas mixture, flow rates, etc.) so that the average temperature of the article is established between 500 and 900° C. Auxiliary heating means can also be used for this purpose.

Under the action of the reactive atmosphere and the temperature, the zirconia article is partially reduced and the nitrogen atoms diffuse in its surface towards its centre, until a surface layer of crystallites of zirconium nitride ZrN is formed.

After plasma nitriding, the article has a golden metallic external appearance and non-zero electrical conductivity characteristic of zirconium nitride ZrN, while retaining high surface hardness and high toughness that allow it to resist wear under normal conditions of use.

As in the case of the plasma carburising method, one of the essential attractions of the plasma nitriding method briefly described above lies in the fact that the zirconia article is transformed over a relatively small thickness, of the order of 10 to 1000 nm, the zirconia (zirconium oxide) in the outer region being transformed into zirconium nitride having metallic properties. Preferably, the plasma nitriding method is adjusted so that the surface layer of zirconium nitride extends from the surface of the article to a depth comprised between 20 and 200 nm.

As in the case of the plasma carburising method, the plasma nitriding treatment generates a stoichiometric gradient between the surface zirconium nitride ZrN and the tetragonal zirconia t-$ZrO_2$ at the centre of the part. The surface layer of zirconium nitride ZrN does not constitute an added coating which would be liable to be torn off or become detached from the surface of the article, in particular when the latter is subjected to high wear conditions.

According to another embodiment of the invention, the finished or semi-finished article based on zirconia is subjected to a carburising treatment carried out in a hot filament type reactor. To this end, provision is made of an article in the finished or semi-finished state of zirconia preferably stabilised in the tetragonal phase by adding 3 mol % of yttrium or yttria $Y_2O_3$. The article is introduced into a reactor wherein an at least partial vacuum is created using a pumping system, before creating a reactive atmosphere of carbon and hydrogen atoms from a mixture of hydrogen and traces of a hydrocarbon, such as methane. For this purpose, the article and the gases enclosed in the reactor are heated by means of at least one resistive element, for example a filament made of refractory metal. The filament(s) are traversed by an electric current which causes them to heat up by the Joule effect. Preferably, it is ensured that the temperature of these filaments reaches at least 1500° C. The white-heated filaments heat the article and the gases by radiation until the hydrogen and the hydrocarbon dissociate, resulting in a reactive atmosphere of hydrogen and carbon atoms. The reduction-carburisation reaction of the zirconia article then takes place using the same diffusion mechanisms as in the plasma carburisation method.

Likewise, in the case of a nitriding treatment in a hot filament reactor, provision is made of an article in the finished or semi-finished state made of zirconia preferably stabilised in the tetragonal phase by adding 3 mol % of yttrium oxide or yttria $Y_2O_3$. The article is introduced into a reactor wherein an at least partial vacuum is created using a pumping system, before creating a reactive atmosphere of nitrogen and hydrogen atoms from a mixture of hydrogen and traces of nitrogen gas $N_2$ or ammonia $NH_3$. For this purpose, the article and the gases enclosed in the reactor are heated by means of at least one resistive element, for example a filament made of refractory metal. The filament(s) are traversed by an electric current which causes them to heat up by the Joule effect. Preferably, it is ensured that the temperature of these filaments reaches at least 1500° C. The filaments thus white-heated will heat the article and the gases by radiation until the hydrogen and nitrogen gas or ammonia dissociate, thus allowing to obtain a reactive atmosphere of hydrogen and nitrogen atoms. The reduction-nitriding reaction of the zirconia article then takes place using the same diffusion mechanisms as in the plasma nitriding method.

Regardless of the case considered, namely nitriding or carburising in a plasma reactor or in a hot filament reactor, the hydrogen atoms present in the atmosphere of the reactor will participate in the heating of the article by recombining with each other on the surface of the zirconia. Indeed, by recombining, the hydrogen atoms release some of their energy towards the zirconia article. Under the effect of heat, some of the oxygen in the article diffuses towards its surface and escapes therefrom. As regards the hydrogen atoms which do not recombine with other hydrogen atoms on the surface of the article, said hydrogen atoms recombine with oxygen atoms contained in the zirconia and therefore actively contribute to the reduction of zirconia. At the same time, the carbon or nitrogen atoms diffuse from the surface to the centre of the article and replace the oxygen atoms that have escaped from the article. This diffusion of carbon or nitrogen atoms into the article causes the appearance of the surface layer wherein these atoms recombine with the partially reduced zirconia to form zirconium carbide or zirconium nitride crystallites, respectively.

According to a particular embodiment of the method according to the invention, prior to the carburising or nitriding step and preferably in the same reactor in order not to have to break the vacuum, at least a portion of the surface of the finished or semi-finished article is subjected to a partial reduction treatment during which oxygen depletion takes place from the surface of the finished or semi-finished article to the centre thereof. The preliminary reduction step effectively achieves a reduction gradient whereby the layer of zirconium carbide ZrC or zirconium nitride ZrN can be formed more efficiently.

It will be noted that the preliminary step of reducing the article carried out in the plasma or hot filament reactor is performed by creating a reactive atmosphere by the dissociation of hydrogen or of a mixture of hydrogen and a neutral gas. This preliminary reduction step is carried out for a duration comprised between 0.5 and 2 hours and with a temperature of the zirconia article preferably comprised between 600° C. and 1300° C.

The plasma or hot filament carburising and nitriding methods require a relatively short treatment time, of the order of 150 minutes, and lead to better reproducibility than the pure reduction method of the prior art. This makes the method according to the invention easily exploitable industrially.

It will be noted that after carburising or nitriding treatment, the surface electrical resistance of the article is typically less than 10Ω/□. The unit Ω/□ is equivalent to the ohmic value of electrical resistances, but specifically characterises the surface electrical resistance of thin layers. This unit is defined as the ratio between the resistivity ρ expressed in Ohm·m of the material from which the thin layer is made and the thickness of the thin layer expressed in metres, which leads to a unit expressed in Ohms, but which is noted Ω/□ to indicate that it is the surface electrical resistance of a thin layer, and not the electrical resistance of a conductor of conventional geometry.

Finally, after carburising or nitriding treatment carried out in a plasma reactor or in a hot filament reactor, the good surface electrical conductivity of the ceramic article thus obtained is used to deposit a metal layer thereon by electroplating.

In a preferred but non-limiting manner, the metal is selected from the group formed of gold, silver, copper, platinum, indium, palladium, rhodium, white and yellow bronzes as well as nickel, and by the alloys of these metals. As regards the electroplating growth, this is done conventionally by circulation of an electric current between an anode and a cathode in a bath wherein are dispersed one or more catalysts as well as the metal that is wished to be deposited on the ceramic article. Note that the ceramic article is connected to the negative pole of the bath, that is to say to the cathode.

In a preferred but non-limiting manner, the deposition parameters are a bath temperature comprised between 60° C. and 70° C. and a current density comprised between 0.1 and 1.0 A/dm$^2$. In the case where the deposited metal is a gold-copper alloy (Au—Cu) and where the catalyst is potassium cyanide, a growth rate typically comprised between 10 and 20 microns/hour is observed on carburized parts. The current density dictates the titre of the alloy deposited (for example a current density comprised between 0.4-0.5 A/dm$^2$ will deposit 18-carat gold) and the resulting growth rate.

A galvanic growth test was carried out on watch dials and bezel made of zirconium oxide stabilised in the tetragonal phase by adding 3 mol % of yttria $Y_2O_3$. The watch bezel includes hour-markers recessed by means of a laser. All parts were carburised in a hot filament reactor. The surface electrical resistance of the parts thus carburised was less than 10Ω/□. The galvanic growth test was performed in an Au—Cu alloy bath and allowed to deposit an 18-carat gold layer 195 micrometres thick. Experience shows that, thanks to the method of the invention, the zirconia parts are covered with a layer of gold. In the particular case of the bezel, the hour-markers are filled with 18-carat gold. Thanks to the invention, it is thus possible in particular to avoid the techniques of physical vapour deposition of the adhesion and seed layers of the prior art and the problems which frequently accompany these techniques, namely risks of delamination and poor abrasion resistance of the deposited layers.

It goes without saying that the present invention is not limited to the embodiments which have just been described and that various modifications and simple variants can be considered by the person skilled in the art without departing from the scope of the invention as defined by the appended claims. It will be noted in particular that the present invention applies to the preparation of articles made of a ceramic material initially non-conductive of electricity for timepieces and pieces of jewellery such as: watch middle parts, watch bezels, watch dials, bracelet links, bridges, plates or oscillating masses for a horological movement, rings, earrings and others.

The invention claimed is:

1. A method for depositing a decorative and/or functional layer on at least a portion of a surface of a finished or semi-finished article made of a ceramic material initially non-conductive of electricity, the method comprising:
   subjecting the at least a portion of the surface of the article to a plasma carburizing or plasma nitriding during which, respectively, carbon or nitrogen atoms diffuse in the at least a portion of the surface of the article, then
   depositing, by galvanic growth of a metallic material, the decorative and/or functional layer on the at least a portion of the surface of the article which has undergone the carburizing or nitriding,
   wherein the plasma carburizing or plasma nitriding is carried out in a plasma reactor or in a hot filament reactor which allows to create a reactive atmosphere,
   wherein the plasma carburizing or plasma nitriding comprises introducing the article into a reactor wherein an at least partial vacuum is created before creating a plasma obtained from ionizing a mixture of hydrogen, neutral gas, and traces of carbon, and
   wherein the article is made of $ZrO_2$, $Al_2O_3$, or $SiO_2$.

2. The method of claim 1, wherein, prior to the plasma carburizing plasma nitriding, the at least a portion of the surface of the finished or semi-finished article is subjected to a reduction, comprising depleting oxygen from the surface to the center of the finished or semi-finished article.

3. The method of claim 1, wherein the article is subjected to the plasma carburizing, and
   wherein the traces of carbon used to form the plasma are obtained from a hydrocarbon or a mixture of hydrocarbons.

4. The method of claim 3, wherein the hydrocarbon(s) are ethane, methane, and/or acetylene.

5. The method of claim 1, wherein the article is subjected to the plasma carburizing, and
   wherein the neutral gas is argon.

6. The method of claim 1, wherein the article is subjected to the plasma carburizing, and
   wherein the article is maintained in the reactive atmosphere created by the plasma for a duration in a range of from 15 to 240 minutes.

7. The method of claim 1, wherein the average temperature of the article during the plasma carburizing varies in a range of from 600 to 1300° C.

8. The method of claim 1, wherein the article is subjected to the plasma nitriding, and
   wherein the neutral gas is argon or neon.

9. The method of claim 1, wherein the article is subjected to the plasma nitriding, and
   wherein the article is maintained in the reactive atmosphere created by the plasma for a duration in a range of from 15 to 240 minutes.

10. The method of claim 1, wherein the average temperature of the article during the plasma nitriding is established in a range of from 500 to 900° C.

11. The method of claim 1, wherein the plasma is generated using a direct current discharge, by radiofrequency (RF) waves, or by microwave.

12. The method of claim 1, wherein the plasma carburizing or plasma nitriding is carried out in a hot filament reactor, comprising creating an at least partial vacuum in the hot filament reactor before creating a reactive atmosphere of atomic carbon or atomic nitrogen which is optionally supplemented by atomic hydrogen.

13. The method of claim 2, wherein the plasma carburizing or plasma nitriding is carried out in a hot filament reactor, comprising creating an at least partial vacuum in the hot filament reactor before creating a reactive atmosphere of atomic carbon or atomic nitrogen whichis optionally supplemented by atomic hydrogen.

14. The method of claim 12, wherein the hot filament reactor comprises a filament, and
   wherein a temperature of the filament reaches at least 1500° C.

15. The method for of claim 14, wherein the at least one filament is made of a refractory metallic material.

16. The method of claim 1, wherein the ceramic article is transformed over a thickness in a range of from 10 to 1000 nm,
   wherein an outermost layer of the ceramic article comprises zirconium carbide or nitride over a thickness of in a range of from 20 to 200 nm.

17. The method for of claim 1, wherein the article is made of the $Zr_2$.

18. The method of claim 14, wherein the zirconia is in tetragonal phase.

19. The method of claim 18, wherein the tetragonal phase is stabilized at room temperature by adding 3 mol % of yttrium oxide $Y_2O_3$.

20. The method of claim 1, wherein the metallic material for the galvanic growth comprises gold, silver, copper, platinum, indium, palladium, rhodium, white bronze, yellow bronze, and/or nickel or alloys of these metals.

21. The method of claim 20, wherein the galvanic growth is carried out in a bath having temperature in a range of from 60 to 70° C., and
wherein the bath circulates a current with a current density in a range of from 0.1 to 1.0 $A/dm^2$.

22. The method of claim 21, wherein the galvanic growth is of a gold-copper alloy on carburized parts, and uses potassium cyanide is used as a catalyst.

23. The method of claim 22, wherein the galvanic growth is of 18 carat gold, using a current density in a range of from 0.4 to 0.5 $A/dm^2$.

24. The method of claim 1, wherein the article after carburizing or nitriding treatment has a surface electrical resistance less than 10 $\Omega/\square$.

25. The method of claim 6, wherein the article is maintained in the reactive atmosphere created by the plasma for a duration of 150 minutes.

26. The method of claim 9, wherein the article is maintained in the reactive atmosphere created by the plasma for a duration of 150 minutes.

27. The method of claim 1, wherein the article is made of the $Al_2O_3$.

28. The method of claim 1, wherein the article is made of the $SiO_2$.

29. The method of claim 1, wherein diffusion of carbon or nitrogen atoms into the article creates crystallites of zirconium carbide or zirconium nitride, to a depth of 1 μm from the surface of the article.

30. The method of claim 1, wherein the plasma carburizing or plasma nitriding is applied at the same rate to an entire surface of the article exposed to an atmosphere of the reactor.

* * * * *